US008041652B2

(12) United States Patent
Barkai et al.

(10) Patent No.: US 8,041,652 B2
(45) Date of Patent: Oct. 18, 2011

(54) MEASURING WEB SITE SATISFACTION OF INFORMATION NEEDS USING PAGE TRAFFIC PROFILE

(75) Inventors: Gilad Barkai, Haifa (IL); David Carmel, Haifa (IL); David Konopnicki, Haifa (IL); Haggai Roitman, Qiryat-Ata (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/987,181

(22) Filed: Jan. 10, 2011

(65) Prior Publication Data
US 2011/0106799 A1    May 5, 2011

(51) Int. Cl.
*G06F 15/18* (2006.01)
(52) U.S. Cl. ......................................................... 706/12
(58) Field of Classification Search ...................... 706/12
See application file for complete search history.

(56) References Cited

U.S. PATENT DOCUMENTS

| | | | |
|---|---|---|---|
| 7,565,367 B2 | 7/2009 | Barrett et al. | |
| 7,600,020 B2 | 10/2009 | Busch et al. | |
| 7,716,198 B2 | 5/2010 | Meyerzon et al. | |
| 7,761,457 B2 | 7/2010 | Error et al. | |
| 7,769,740 B2 | 8/2010 | Martinez et al. | |
| 2002/0078045 A1* | 6/2002 | Dutta | ................................ 707/7 |
| 2007/0106641 A1* | 5/2007 | Chi et al. | ........................... 707/3 |
| 2009/0327353 A1 | 12/2009 | Zhuge et al. | |
| 2010/0070514 A1 | 3/2010 | Woodruff | |
| 2010/0131563 A1* | 5/2010 | Yin | ............................... 707/794 |

FOREIGN PATENT DOCUMENTS

WO    2010027914    3/2010

OTHER PUBLICATIONS

Stuart K. Card and David Nation, "Degree-Of-Interest Trees: A Component of an Attention-Reactive User Interface", AVI2002, Advanced Visual Interface (Trento, Italy, May 22-24, 2002): 231-245. URL: http://citeseerx.ist.psu.edu/viewdoc/download?doi=10.1.1.62.5761&rep=rep1&type=pdf.
Andy Edmonds et al., "Instrumenting the Dynamic Web", Journal of Web Engineering, vol. 6, No. 3 (2007) 244-260. URL: http://citeseerx.ist.psu.edu/viewdoc/download?doi=10.1.1.92.4483&rep=rep1&type=pdf.

* cited by examiner

*Primary Examiner* — David R Vincent
*Assistant Examiner* — Li-Wu Chang (57) ABSTRACT

A method, system, and computer program product for measuring web site satisfaction of information needs are provided. The method includes: selecting a page for analysis; generating a page profile in the form of a list of keywords representing the page; generating a page traffic profile in the form of lists of keywords representing information needs of users, wherein the page traffic profile is generated from keywords used by users to visit the page; determining the success of users' visits to the page; and analyzing whether a page satisfies users' information needs by applying a distance measure between the keywords of the page profile and the keywords of the page traffic profile and combining the distance measure result with a success rate of the keywords.

22 Claims, 8 Drawing Sheets

MEASURING WEB SITE SATISFACTION OF INFORMATION NEEDS USING PAGE TRAFFIC PROFILE

BACKGROUND

This invention relates to the field of web site analysis. In particular, the invention relates to measuring web site satisfaction of information needs.

The purpose of web analytics tools is the measurement, collection, analysis and reporting of internet data for purposes of understanding and optimizing web usage. A known web analytics tool is Google Analytics (Google is a trade mark of Google, Inc.).

Web analytics tools measure all kinds of key performance indicators (KPIs) (for example, hit rate and bounce rate) that measure the effectiveness of pages from the site, together with some global measures like the most popular browsing paths into a site's hypertext.

In addition, web analytics tools allow discovery of the terms that when used by users in internet search engine queries have brought them to a specific site.

Web analytics tools also allow measurement of whether some targets are reached by users visiting a site. For example, a site may assume that the information need of a user is fulfilled by a page whenever the user stays at least 30 seconds before leaving it.

The measurements can be analyzed by content providers in order to tune the content of their sites. To do so, they need to interpret those KPIs and try to figure out what are the users are looking for and why they like or do not like what they find in the site. There is no automated way to analyze what is the "information need" of the users browsing a site, how it evolves while browsing, and automatically detecting whether this information need is fulfilled or not, other than the time spent on a page.

BRIEF SUMMARY

According to a first aspect of the present invention there is provided a method for measuring web site satisfaction of information needs, comprising: selecting a page for analysis; generating a page profile in the form of a list of keywords representing the page; generating a page traffic profile in the form of lists of keywords representing information needs of users, wherein the page traffic profile is generated from keywords used by users to visit the page; determining the success of users' visits to the page; analyzing whether a page satisfies users' information needs by comparing the page profile, the page traffic profile, and the success of users visiting the page using keywords of the page traffic profile; analyzing whether a page satisfies users' information needs by applying a distance measure between the keywords of the page profile and the keywords of the page traffic profile and combining the distance measure result with a success rate of the keywords; wherein said steps are implemented in either: computer hardware configured to perform said steps, or computer software embodied in a non-transitory, tangible, computer-readable storage medium.

A computer program product for measuring web site satisfaction of information needs, the computer program product comprising: a computer readable storage medium having computer readable program code embodied therewith, the computer readable program code comprising: computer readable program code configured to: select a page for analysis; generate a page profile in the form of a list of keywords representing the page; generate a page traffic profile in the form of lists of keywords representing information needs of users, wherein the page traffic profile is generated from keywords used by users to visit the page; determine the success of users' visits to the page using keywords of the page traffic profile; analyze whether a page satisfies users' information needs by applying a distance measure between the keywords of the page profile and the keywords of the page traffic profile and combining the distance measure result with a success rate of the keywords.

A system for measuring web site satisfaction of information needs comprising: a processor; a page selection component for selecting a page for analysis; a page profile component for generating a page profile in the form of a list of keywords representing the page; a page traffic profile component for generating a page traffic profile in the form of lists of keywords representing information needs of users, wherein the page traffic profile is generated from keywords used by users to visit the page; a success component for determining the success of users' visits to the page using keywords of the page traffic profile; and an analysis component for analyzing whether a page satisfies users' information needs by applying a distance measure between the keywords of the page profile and the keywords of the page traffic profile and combining the distance measure result with a success rate of the keywords.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The described method, system, and computer program product provide an automated way to compute the information need of the users visiting a site, detecting whether this information drifts while the site is being visited and whether it is ultimately fulfilled.

For each page, a "page profile" is computed considering the keywords that best describe the content of the page. In addition, for each page, the information need of the users reaching the page is computed by considering keywords used to reach the page either directly (for example, through web or internal search engine queries or in-link anchor text), or indirectly (for example, through a session of several in-links followed to reach a page). This is referred to as the "page traffic profile".

By comparing the page profile and the page traffic profile, it can be estimated whether the content of a page satisfies the information need of the users visiting it.

Keywords and lists of words are referred to and should be interpreted as including terms formed of words, phrases, and numerals.

Figure 1:
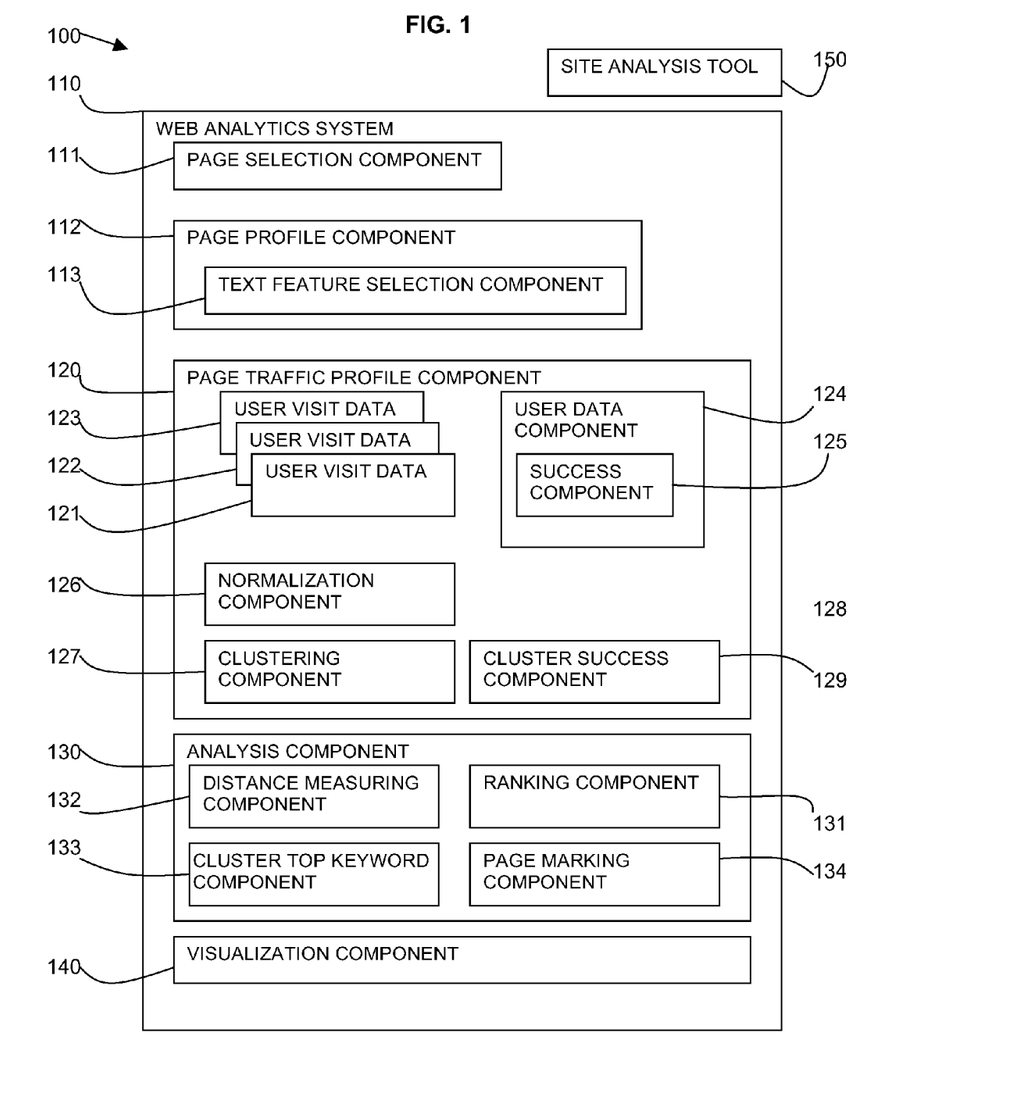
FIG. 1 is a block diagram of a system in accordance with the present invention.

Referring to FIG. 1, a block diagram shows an example embodiment of the described system 100.

A web analytics system 110 is provided which may include a page selection component 111 for selecting a page to be analyzed.

A page profile component 112 may compute a page profile in the form of a list of keywords. The page profile component 112 may include a text feature selection algorithm 113 for generating the list of keywords for the page.

A page traffic profile component 120 may include data from multiple users' visits 121-123 to the selected page. The user visit data 121-123 may take various different forms including text data from: internal queries, external queries, in-links anchor text data, browsing sessions, etc. A user data component 124 may use the user visit data 121-123 to generate a list of keywords for a user's visit to the page. The user data component 124 may include a success component 125 for obtaining the success of a user's visit to the page from a site analysis tool 150.

A site analysis tool 150 may be provided externally to the described web analytics system 110 and collect data to track user sessions on a web site, for example, using JavaScript code (JavaScript is a trade mark of Sun Microsystems, Inc.) and client cookies. Each page may have a success criterion set by the site owner, for example, by determining the amount of time a user spent at the page, business logic rules, goals, etc.

The page traffic profile component 120 may include processing components for processing the combined user visit data 121-123 to generate a page traffic profile in the form of a list of keywords representing users' information needs.

The processing components may include a normalization component 126 for applying normalization to the combined lists of keywords for users' visits to the page. A clustering component 127 may be provided for clustering the users by topic or keyword or keywords to represent sets of users having the same information need. The set of clusters is the page traffic profile.

A cluster success component 129 may be provided to compute the success rate of the cluster. The success rate of a cluster may be defined as the relative page traffic that includes the cluster term(s) in which user page visit successfully ended (based on the success criterion set by the site owner). "Relative page traffic" refers to those page visits out of all page visits that were associated with the keywords that belong to the analyzed cluster, i.e., either search keywords, in-link anchor text keyword, etc. A cluster importance or relative success may be measured by a combination of distance and relative success of its traffic amount compared to other clusters.

The web analytics system 110 may include an analysis component 130 for analyzing the page profile and the page traffic profile. The analysis component 130 may include a distance measuring component 132 for measuring the distance between keywords in the page profile and in a current cluster of the page traffic profile. The analysis component 130 may also include a ranking component 131 for combining the distance measurement and the success of the cluster as determined by the cluster success component 129 and ranking the cluster and therefore the keyword(s) of the cluster.

A page marking component 134 may be provided to mark the page with the keywords of the cluster or the top keywords of the cluster indicating the analysis ranking result. Keywords are ranked according to their relative contribution to the page traffic profile and page profile distance and the relative success rate associated with them.

A cluster top keywords component 133 may be provided to generate the top keywords most representative of a cluster which may be used for visualization of the analysis.

The web analytics system 110 may include a visualization component 140 providing a visualization of the analysis of the page.

Figure 2:
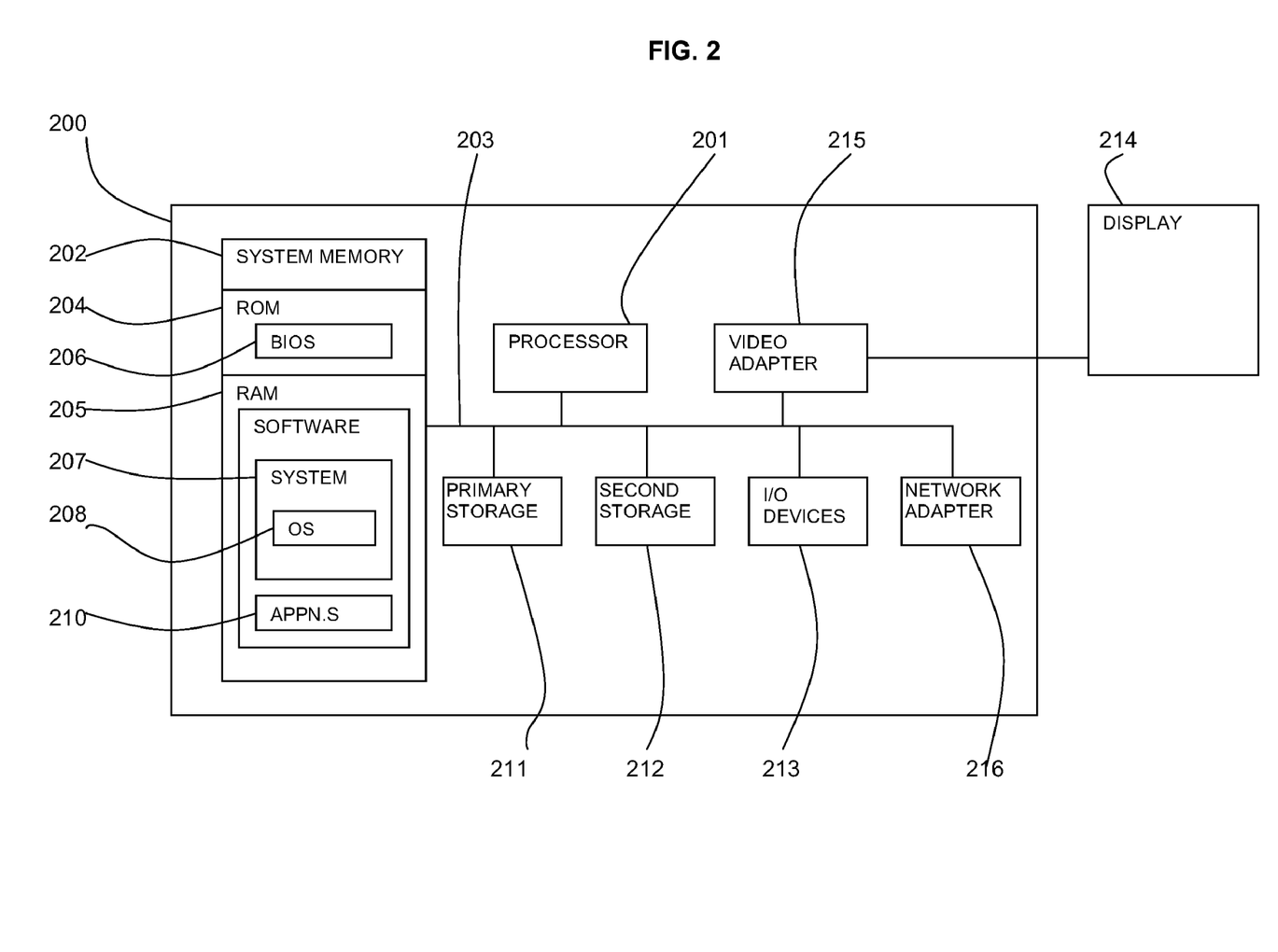
FIG. 2 is a block diagram of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3A:
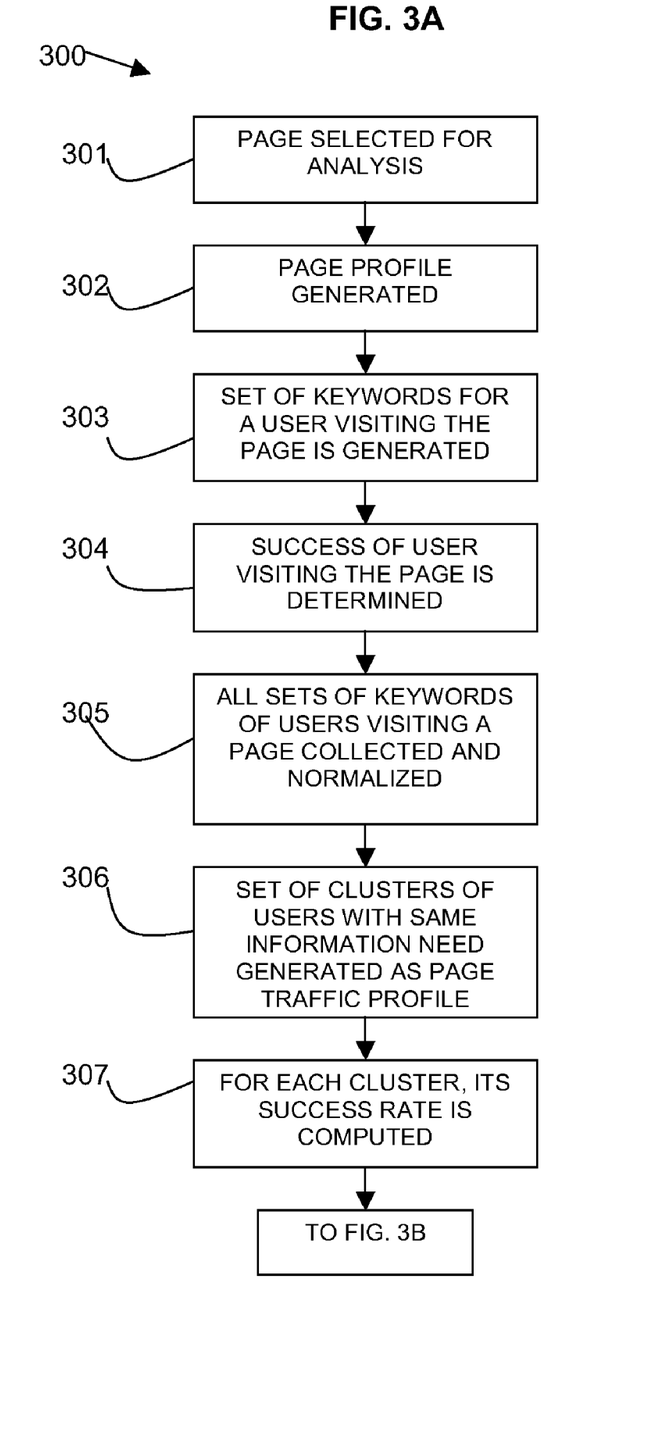
FIGS. 3A and 3B are flow diagrams of a method in accordance with the present invention.
Figure 3B:
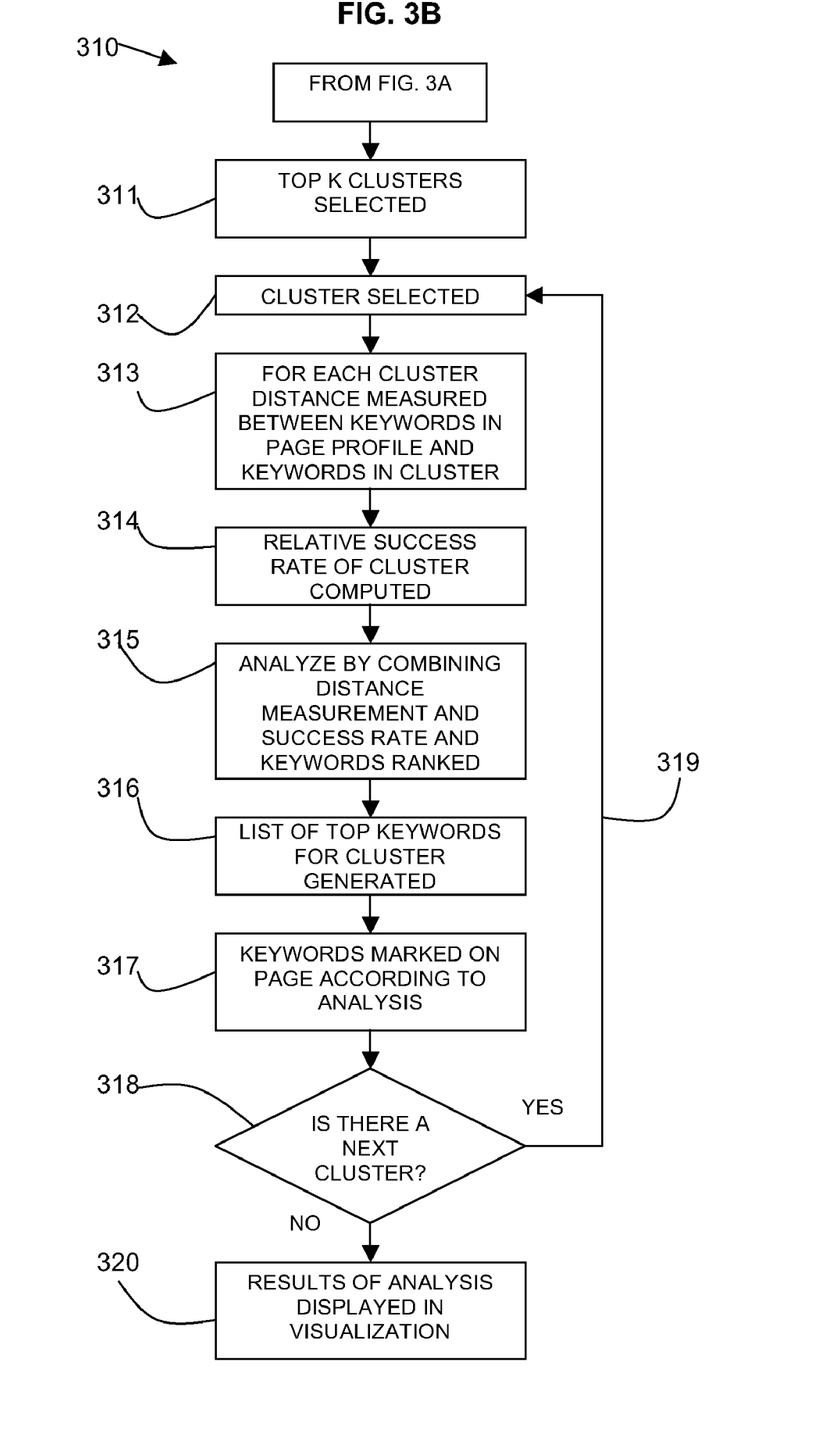

Referring to FIGS. 3A and 3B, flow diagrams 300, 310 show an embodiment of the described method.

In FIG. 3A, a page may be selected 301 for analysis. A page profile may be generated 302 as a list of keywords representing the information found on the page. This may be done by using a text feature selection algorithm (for example, Mutual Information, tf—idf weight (term frequency—inverse document frequency), Chi-square, or Kullback-Leibler divergence).

A set of keywords representing the information needs of users may be generated 303. This may be from internal and/or external queries that enabled a user to reach a page, the text of consecutive page in-links anchor texts that led the user to the page, etc. The success of users visits may also be determined 304, for example, from a site analysis tool which determines a success criterion for a page such as determining the amount of time a user spends on a page.

The sets of keywords of all users for a page may be collected and normalized 305. A set of clustered topics or keywords representing users having the same information need may be generated 306. For example, clusters may be generated from in-links, wherein given a keyword, the traffic it accumulates is the traffic from all in-links that contain that keyword. The set of keywords of the cluster's topics or keywords represents the page traffic profile for the page.

For each cluster, the success rate of the cluster may be computed 307. The computed success rate may include a relative success rate of a cluster compared to the visit traffic to all the clusters; this is also referred to as the cluster importance, i.e., importance(cluster)=(#unsuccessful visits based on cluster keyword or topic)/(#all cluster visit counts). For example, if some cluster has 30% of the visit traffic (e.g., 30 out of 100) with 40% success (12), its relative importance will be: (30−12)/100=18%. The final score for the cluster will be later given by the combination with the relative distance contribution of that cluster's keyword/s In FIG. 3B, the method continues and either all the clusters or the top k clusters that compose the page traffic profile may be selected 311. For each selected cluster 312, the distance is measured 313 between keywords in the page profile and keywords in the current cluster. The relative success rate of the cluster may be computed 314. Analysis is carried out by combining the distance and success rate to categorize and rank the keywords 315. A list of the top keywords most representative of the cluster may be generated 316 and marked on the page 317 according to the rank analysis.

It is determined 318 if there is a next cluster. If so, the method loops 319 and analyzes the next cluster. If there is not a next cluster, the results of the analysis may be displayed 320 in a visualization.

"Marginal contribution" is defined as the relative score that the keyword contributes to the cluster with respect to relative cluster success rate and that keyword distance value (as calculated by a distance measure between the keyword in the page profile and the keyword in page traffic profile cluster). The final score for page analysis is based on the aggregation of marginal contributions of all keywords in the page traffic profile.

The method for generating a page traffic profile may be based on direct traffic to the page, for example, following a single query, or from in-links within a site. For every page of a web site, the following information obtained from a web analytics program is considered. Each user visit that reached the page p is characterized by a bag of words $b_p$ composed by:

The internal and/or external queries that enabled him to reach any page in the site.

The text of the consecutive page in-link anchor texts that lead him/her from his/her start page on the site to the current page.

The success or failure of the visit. Given that some keyword is associated with a current user visit to the page (e.g., keyword on the hyperlink that sent the user to the page), if the current user visit was successful (again, determined by the site's internal success policy for the page goals), this success contributes 1 to the total success count, otherwise 0. Therefore, 30% for some keyword/cluster, for example, will mean that 30% of page visits that where associated with that keyword/cluster ended successfully. A relative cluster success rate may then be determined by the success of the cluster normalized over all the clusters.

It is assumed that the resultant keywords represent the information need of the users browsing the page through this direct traffic.

The page traffic profile may also be generated using indirect traffic from a browsing session of a user which led to the analyzed page. Let s be a browsing session of some user which lead to page p which is being analyzed. Let s=l1→ l2→ . . . p be the session, described using the sequence of hyperlinks l that lead the user to page p. Each hyperlink is associated with anchor text.

In the direct traffic scenario above, it was assumed that a simple case was provided where the user came to the page through one step or from within the same site. The second embodiment of indirect traffic applies a more generalized profiling method, in which there are several options to calculate the keyword importance.

For a given user, the marginal contribution of that user's session to the page p traffic profile (which is given by the aggregating the sessions of all users that reached page p) may be calculated using the following options:

Option 1: Concatenation: the compound information need that lead the user to page p is given by simple concatenation of all anchor text of hyperlinks the user clicked prior to reaching page p, including possible search keywords that lead the user to first page of the session (in case the user session was initiated by search).

Option 2: Smoothing: a smoothing function is used which smoothes the relative contribution of each session step (i.e., hyperlink follow) to the information need of the user. Smoothing is performed recursively on the session steps. Possible smoothing functions are linear smoothing, decaying functions, exponential smoothing, etc.

Such smoothing gives more importance to keywords that appear in in-link anchor text that belong to pages that are were followed later in the session, i.e., the keyword appearance in prior page in-link to target page get more importance that the same keyword appearing two pages before.

Option 3: Combined: Similar to Option 1 combined with Option 2, with the difference that anchor text that is related to hyperlinks that were clicked closer to reaching page p get more importance. This can be done using text boosting.

Figure 4:
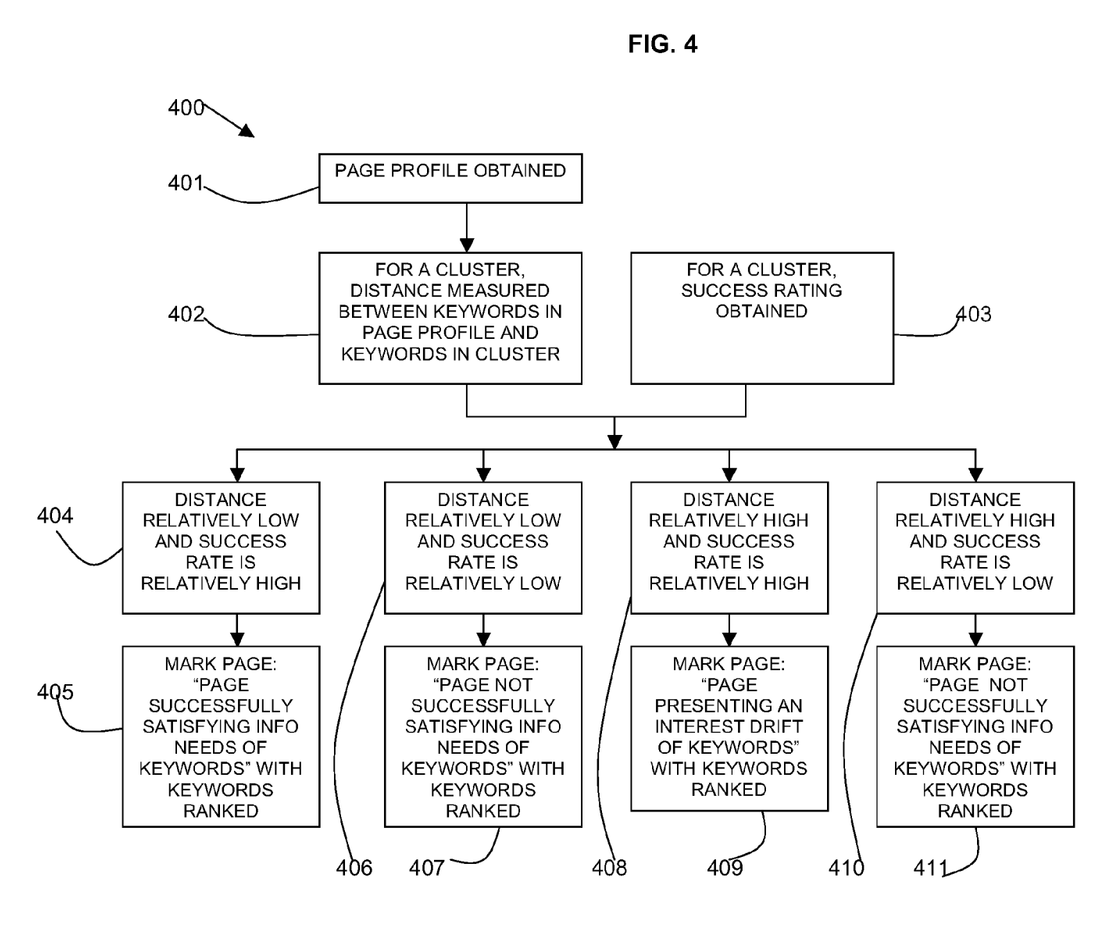
FIG. 4 is a flow diagram of an aspect of the method in accordance with the present invention.

Referring to FIG. 4, a flow diagram 400 shows an embodiment of the described method. For a page, it is analyzed whether it fulfils the information need of the users. The page profile in the form of the top-k keywords that most represent the page is obtained 401 by a feature selection method.

For a cluster in the page traffic profile of a keyword or keywords representing a set of users' information need, the distance is measured 402 between the keywords in the page profile and the keywords in the current cluster (different text metrics like cosine similarity, Kullback-Leibler (KL) divergence/Jensen-Shannon divergence (JSD) distance can be used here). The relative success of the cluster is also obtained 403 as described above which reflects the success of the keyword(s) of the cluster.

Keywords are ranked by the combination of their representativeness (based on a distance measurement method) and their success rate.

The following results may be obtained.

Case 1: If the distance is relatively low and the success rate is relatively high 404, mark 405 this page as "Page successfully satisfying the information needs . . . " listing the keywords most representative of the cluster. This indicates that users' information needs are similar to what page content is focused about, and success rate is high, meaning that the content properly covers the information need. The keywords are ranked within this category with the keywords that contribute the least to the distance and the highest success rate ranked highest.

Case 2: If the distance is relatively low and the success rate is relatively low 406, mark 407 this page as "Page not successful in satisfying the information needs of . . . " listing the keywords most representative of the cluster. The keywords are ranked within this category. This indicates that users have some information need that is not satisfies by the visited page, even though the page was expected to satisfy the users, due to the small distance. In this case, keywords that contribute the least to the distance and have the lowest success rate are ranked first.

Case 3: If the distance is relatively high and the success rate is relatively high 408, mark 409 this page as "Page presenting an interest drift for information need . . . " listing the keywords most representative of the cluster. "Interest drift" means that although users come with an initial information need, pages still manage to satisfy the information need of users, which apparently "changed" when they visit the page. The keywords are ranked within this category. In this case, keywords that contribute the most to the distance (i.e. high KL values are now considered compared to the previous cases where low KL values were considered) and have the highest success rate are ranked higher.

Case 4: If the distance is relatively high and the success rate is relatively low 410, mark 411 this page as "Page not successful in satisfying the information needs of . . . " listing the keywords most representative of the cluster. This is the classic case where it is detected that users' information needs are not satisfied due to page content that apparently does not cover user needs. The keywords are ranked within this category. In this case, keywords which contribute the most to the distance and have the lowest success rate will be ranked higher.

References to "relatively" low and high related to relativeness measured to the other pages of the site.

The marked page can now be returned to the site administrator ordered by distance and/or success rate. The administrator will use this information to understand how to improve the content of the site. In particular, the content of the pages not satisfying the information need of the people browsing them should be modified.

Figure 5:
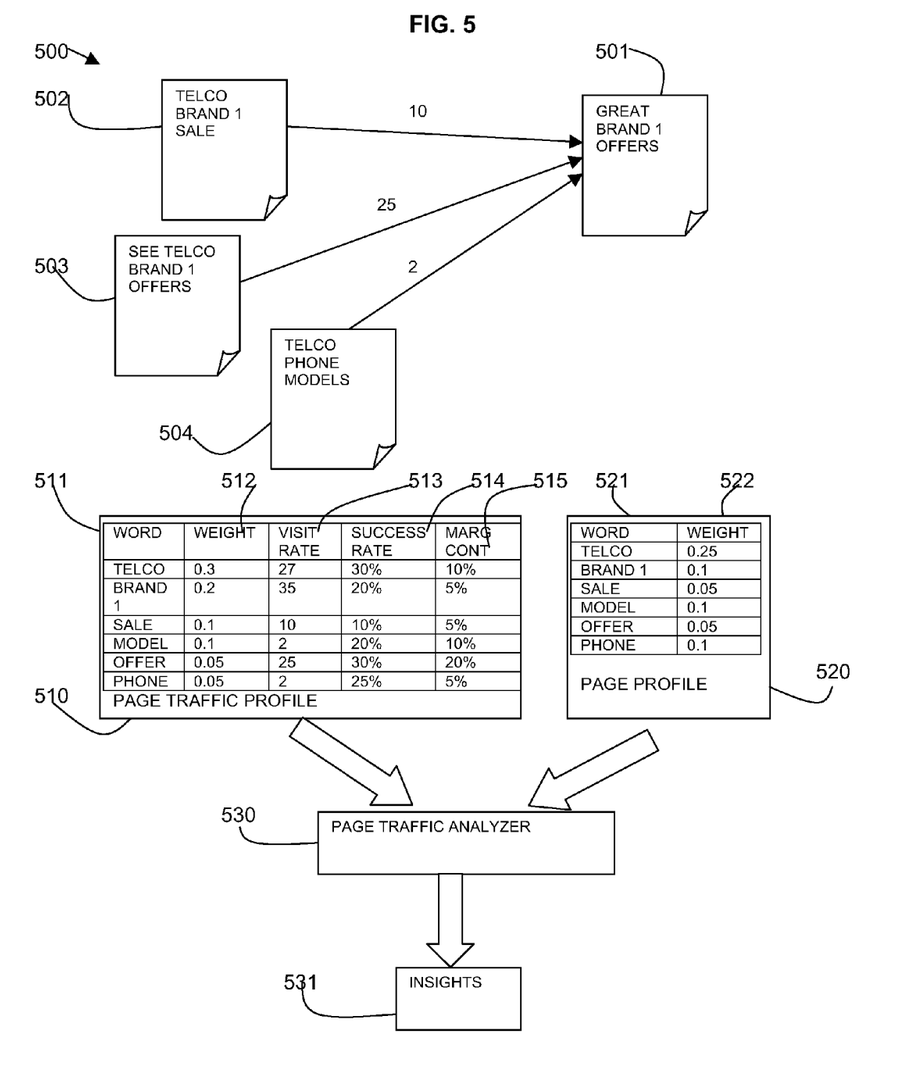
FIG. 5 is a schematic diagram of a web page analysis in accordance with the present invention.

Referring to FIG. 5, a schematic diagram 500 shows an embodiment of the described method. A target page 501 to be analyzed is shown. In this example, it is a page called "Great Brand 1 Offers!". The success of a user visit may be determined, for example, if the session time is greater than one minute in duration.

Visit rates from other pages 502, 503, 504 are determined as the information needs in this example are extracted from anchor text data. In this example, a page 502 "Telco Brand 1 sale" has 10 visits from it to the target page 501. A page 503 "See Telco Brand 1 offers" has 25 visits from it to the target page 502. A page 504 "Telco phone models" has 2 visits from it to the target page 501.

A page traffic profile 510 is generated with a list of keywords 511, each keyword's weight 512 obtained by the distance measurement method described above, each keyword's visit rate 513, and each keyword's success rate 514, and keyword marginal contribution 515 to the distance to the page profile.

A page profile 520 is generated with a list of keywords 521, and each keyword's weight 522 as obtained by the feature selection method described above.

Figure 6A:
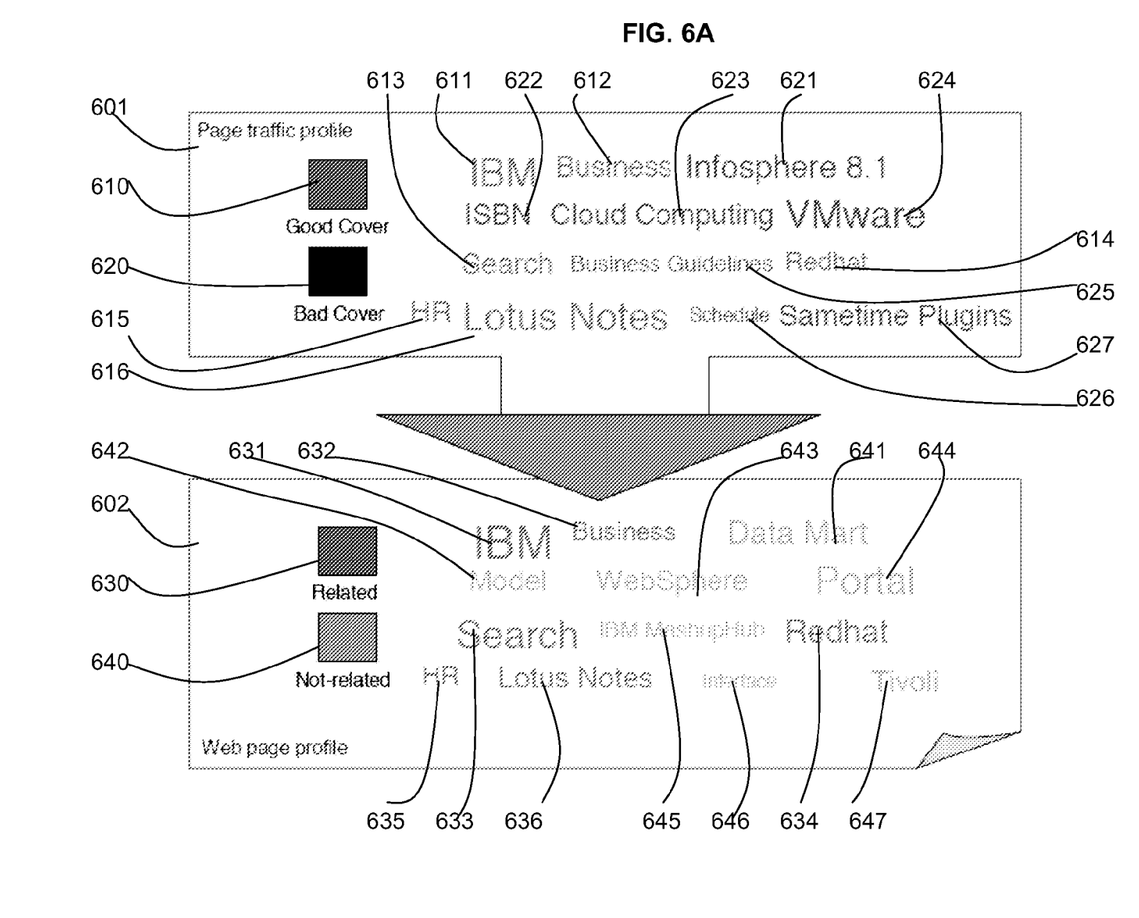
FIGS. 6A and 6B are diagrams showing visualization of web page analysis in accordance with the present invention.
Figure 6B:
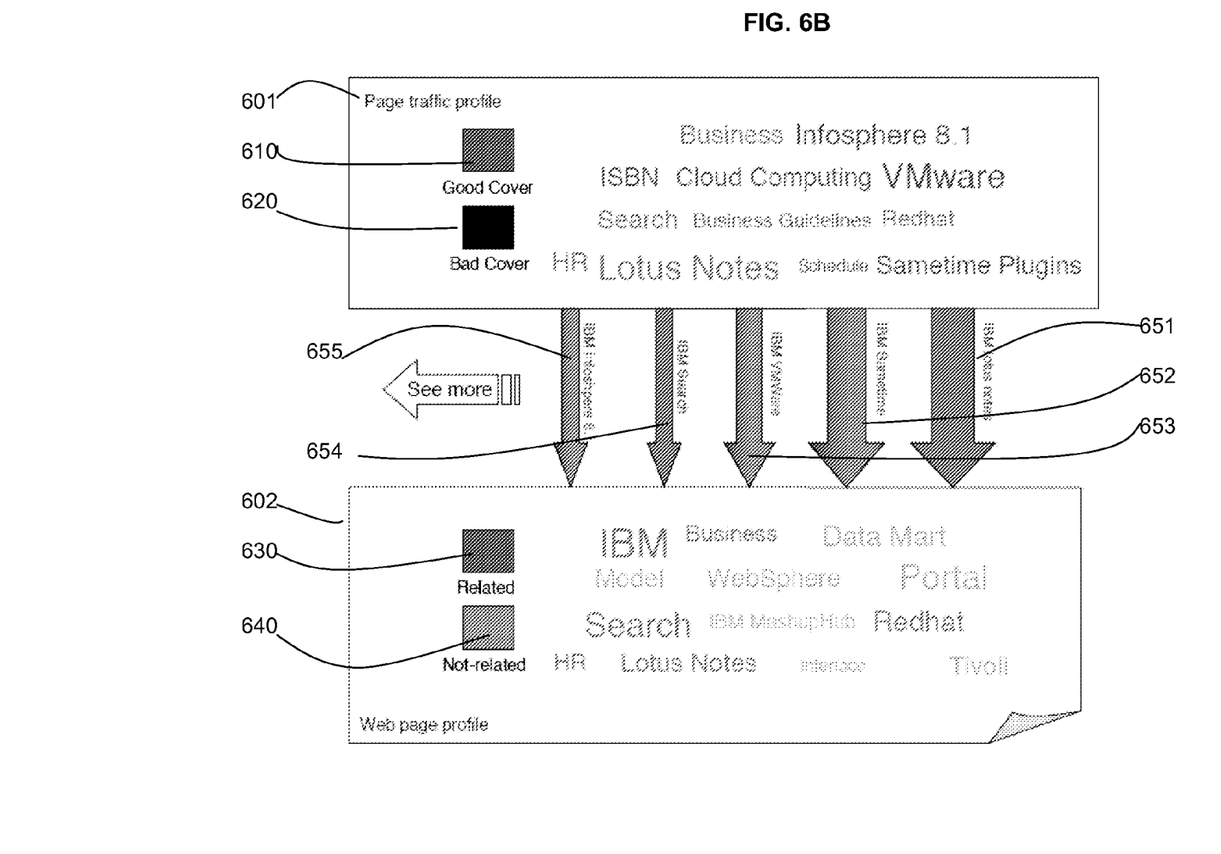

The page traffic profile 510 and the page profile 520 may be visualized as tag clouds using the keywords' weights as shown in relation to FIGS. 6A and 6B.

A page traffic analyzer 530 analyzes the inputs of the page traffic profile 510 and the page profile 520 and insights 531 for the page are output including information need coverage of the page, in-link anchor text analysis, page abandonment analysis, recommendations, etc.

Content satisfiability measures how well a given content (e.g., set of web documents) satisfies some information need profile. Satisfaction of the information need profile can be measured using content analysis methods such as content coverage analysis, measuring for example the distance between information needs embedded within query logs to the content that is returned for each query.

Visualization of content satisfiability is important for purposes of content and web analytics. For example, given some profile that express some web site user information needs, and some content for examination of its satisfiability, such visualization can help a web master to trace the drawbacks of the current content management policy on his managed web site. Though, existing visualization tools such as tag clouds lack semantics of satisfiability. Also, since satisfiability depends on both the information need profile and the content examined, new ways to visualize such satisfiability are required which can help to immediately trace problematic content areas that need more attention.

As another example, content providers can use such visualization to denote content popularity (using tag clouds) with satisfiability graphical annotations that can explain users which content is currently available on site and which is not, etc.

A visualization is described for content satisfiability measures, extending the traditional tag-cloud paradigm with new type of cloud annotations that denote satisfiability levels and satisfiability relationships between user information needs and content that is supposed to cover such needs.

Referring to FIGS. 6A and 6B, example embodiments of visualization are shown. In these examples, a tag cloud is generated from a given page in-links anchor text that represent the information needs of users that visit that page.

In FIG. 6A, the upper bi-colored tag cloud 601 represents a page traffic profile and has keywords drawn in different font sizes according to their frequency, in this case traffic rate to the page. A first color 610 is used to represent topics that are well covered (for example, green) and a second color 620 is used to represent topics that are not well satisfied in the system (for example, red).

In this example, keywords: IBM 611, Business 612, Search 613, Redhat 614, HR 615 and Lotus Notes 616 are displayed in the first color 610 indicating that they are well covered in the page traffic profile. The keywords: Infosphere 8.1 621, ISBN 622, Cloud Computing 623, VMware 624, Business Guidelines 625, Schedule 626, and Sametime Plugins 627 are displayed in the second color 620 indicating that they are not well covered in the page traffic profile. (IBM, Lotus Notes, Infosphere, and Sametime are trade marks of International Business Machines Corporation; VMware is a trade mark of VMware, Inc.; Redhat is a trade mark of Red Hat, Inc.)

An additional graphical satisfiability annotation that could be used in order to denote the level of satisfiability is different font transparency levels, where a topic that is not well satisfied is represented using a more transparent red font, while a topic better covered is represented with a bolder green font.

A topic with large size font colored in red means that there is a lot of traffic to that page related to that topic, but currently the page does not satisfy that information need that well (the additional font transparency level would denote how much).

Note that as an alternative to annotation of satisfiability using transparency level, a more general color scale (with labels per color explaining the satisfiability level) could be used to denote a more fine granular measure.

For the site usage analysis purposes, such visualization further provides another tag cloud 602 visualizing a web page profile that is also colored to indicate for each keyword how representative it is with respect to the examined page content. A first color 630 is used to denote good representative terms (for example, green) and a second color 640 is used to denote terms that might not be good for that page for purposes of content satisfiability (for example, orange).

For example, the keywords: IBM 631, Business 632, Search 633, Redhat 634, HR 635, Lotus Notes 636 are displayed in the first color 630 indicating that the keywords are representative of the page content. The keywords: Data Mart 641, Model 642, WebSphere 643, Portal 644, IBM MashupHub 645, Interface 646, Tivoli 647 are displayed in the second color 640 indicating that the keywords are not representative of the page content. (WebSphere, Tivoli, MashupHub are trade marks of International Business Machines Corporation)

Referring to FIG. 6B, the relationship between the tag cloud for the page traffic profile 601 indicating the user information needs to the tag cloud for the page profile 602 is visualized using color scaled arrows 651-655. Arrow width represents traffic size to the page through that hyperlink Arrow colour represents calculation of success rate based on page traffic profile keyword that appear on that hyperlink anchor text (For example, the better satisfied, the greener/lighter the colour is, the worse it is, the redder/bolder the colour is). For example, an arrow for "IBM lotus notes" 651 is a wide green arrow indicating that the keywords IBM and lotus notes are both well represented in the page traffic profile 601 and the page profile 602.

For information need given by in-links anchor text, the visualization further provides means of navigation over such links with respect to content satisfiability, where by clicking on one of the keywords in any of the tag clouds (IBM) in the illustrated example, in-links that relate the information need profile to the page content profile are displayed, widen according to their popularity (i.e., page traffic) which color is determined by the set of keywords of that consist of the in-link anchor text and their satisfiability level. For example, the "IBM lotus note" in-link has highest traffic to that page and all its topic aspects (i.e., IBM and "lotus notes") are well satisfied by that page, and therefore, the page is fully colored in green.

A system for measuring web site satisfaction of information needs and/or a visualization system may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for measuring web site satisfaction of information needs, performed by a processor, comprising:
    selecting a page for analysis;
    generating a page profile in the form of a list of keywords representing the page;
    generating a page traffic profile in the form of lists of keywords representing information needs of users, wherein the page traffic profile is generated from keywords used by users to visit the page;
    determining the success of users' visits to the page using keywords of the page traffic profile; and
    analyzing whether a page satisfies users' information needs by applying a distance measure between the keywords of the page profile and the keywords of the page traffic profile and combining the distance measure result with a success rate of the keywords,
    wherein generating a page traffic profile includes:
    clustering keywords used to visit the page of multiple users to generate a list of keywords representing a group of users' information needs; and
    computing a relative success rate of a cluster of keywords.

2. The method as claimed in claim 1, wherein the distance measure and the success rate are measured relative to other pages on the web site of the selected page.

3. The method as claimed in claim 1, wherein determining the success of users' visits to the page is carried out by determining if a visit meets an internal success criterion based on one or more of: time spent on page, business logic rules, goals.

4. The method as claimed in claim 1, wherein generating a page profile uses a text feature selection method to determine the keywords representing the page.

5. The method as claimed in claim 1, wherein generating a page traffic profile considers direct traffic to a page including one or more of the group of: query keywords used to reach the page; in-links anchor text used to reach the page.

6. The method as claimed in claim 1, wherein generating a page traffic profile considers indirect traffic to a page wherein indirect traffic follows a path through multiple steps in the form of pages or in-links to a page.

7. The method as claimed in claim 6, wherein the page traffic profile includes one or more of the group of: concatenation of anchor text of hyperlinks used to reach the page and/or query keywords used in an initial query resulting in a browsing session reaching the page, smoothing of relative contributions of each session step, relative boosting of results closer to the end page.

8. The method as claimed in claim 1, wherein analyzing whether a page satisfies users' information needs considers a distance measurement between the list of keywords of the page profile and the list of keywords of a cluster, and the success of the cluster relative to other pages.

9. The method as claimed in claim 1, including:
    displaying a visualization of the analysis including:
        displaying a first tag cloud of the list of keywords of the page profile with a scaled representation of how representative the keyword is of the page content;
        displaying a second tag cloud of the list of keywords of the page traffic profile with a scaled representation of how well satisfied the keyword is in the page content.

10. The method as claimed in claim 9, wherein in the first tag cloud different colors are used to represent scales of well represented keywords and scales of poorly represented keywords.

11. The method as claimed in claim 9, wherein in the second tag cloud different colors are used to represent scales of well satisfied the keywords in the page content and scales of poorly satisfied keywords in the page content.

12. A computer-implemented method for measuring web site satisfaction of information needs, performed by a processor, comprising:
 selecting a page for analysis;
 generating a page profile in the form of a list of keywords representing the page;
 generating a page traffic profile in the form of lists of keywords representing information needs of users, wherein the page traffic profile is generated from keywords used by users to visit the page;
 determining the success of users' visits to the page using keywords of the page traffic profile; and
 analyzing whether a page satisfies users' information needs by applying a distance measure between the keywords of the page profile and the keywords of the page traffic profile and combining the distance measure result with a success rate of the keywords, wherein:
 if the distance measure is relatively low and the success rate is relatively high it is determined that the page satisfies the information need for a keyword; and
 the method includes returning a ranked list of keywords in this category for the page.

13. A computer-implemented method for measuring web site satisfaction of information needs, performed by a processor, comprising:
 selecting a page for analysis;
 generating a page profile in the form of a list of keywords representing the page;
 generating a page traffic profile in the form of lists of keywords representing information needs of users, wherein the page traffic profile is generated from keywords used by users to visit the page;
 determining the success of users' visits to the page using keywords of the page traffic profile; and
 analyzing whether a page satisfies users' information needs by applying a distance measure between the keywords of the page profile and the keywords of the page traffic profile and combining the distance measure result with a success rate of the keywords, wherein:
 if the distance measure is relatively low and the success rate is relatively low it is determined that the page does not satisfy the information need for a keyword; and
 the method includes returning a ranked list of keywords in this category for the page.

14. A computer-implemented method for measuring web site satisfaction of information needs, performed by a processor, comprising:
 selecting a page for analysis;
 generating a page profile in the form of a list of keywords representing the page;
 generating a page traffic profile in the form of lists of keywords representing information needs of users, wherein the page traffic profile is generated from keywords used by users to visit the page;
 determining the success of users' visits to the page using keywords of the page traffic profile; and
 analyzing whether a page satisfies users' information needs by applying a distance measure between the keywords of the page profile and the keywords of the page traffic profile and combining the distance measure result with a success rate of the keywords, wherein:
 if the distance measure is relatively high and the success rate is relatively high it is determined that the page presents an interest drift for an information need for a keyword; and
 the method includes returning a ranked list of keywords in this category for the page.

15. A computer-implemented method for measuring web site satisfaction of information needs, performed by a processor, comprising:
 selecting a page for analysis;
 generating a page profile in the form of a list of keywords representing the page;
 generating a page traffic profile in the form of lists of keywords representing information needs of users, wherein the page traffic profile is generated from keywords used by users to visit the page;
 determining the success of users' visits to the page using keywords of the page traffic profile; and
 analyzing whether a page satisfies users' information needs by applying a distance measure between the keywords of the page profile and the keywords of the page traffic profile and combining the distance measure result with a success rate of the keywords, wherein:
 if the distance measure is relatively high and the success rate is relatively low it is determined that the page does not satisfy the information need for a keyword; and
 the method includes returning a ranked list of keywords in this category for the page.

16. A computer-implemented method for measuring web site satisfaction of information needs, performed by a processor, comprising:
 selecting a page for analysis;
 generating a page profile in the form of a list of keywords representing the page;
 generating a page traffic profile in the form of lists of keywords representing information needs of users, wherein the page traffic profile is generated from keywords used by users to visit the page;
 determining the success of users' visits to the page using keywords of the page traffic profile;
 analyzing whether a page satisfies users' information needs by applying a distance measure between the keywords of the page profile and the keywords of the page traffic profile and combining the distance measure result with a success rate of the keywords; and
 displaying a visualization of the analysis including:
  displaying a first tag cloud of the list of keywords of the page profile with a scaled representation of how representative the keyword is of the page content;
  displaying a second tag cloud of the list of keywords of the page traffic profile with a scaled representation of how well satisfied the keyword is in the page content; and
  displaying arrows between the first and second tag clouds that represent the traffic, the traffic success, and traffic satisfaction.

17. A computer program product for measuring web site satisfaction of information needs, the computer program product comprising:
 a computer readable storage medium having computer readable program code embodied therewith, the computer readable program code comprising:
 computer readable program code configured to:
  select a page for analysis;
  generate a page profile in the form of a list of keywords representing the page;

generate a page traffic profile in the form of lists of keywords representing information needs of users, wherein the page traffic profile is generated from keywords used by users to visit the page;

determine the success of users' visits to the page using keywords of the page traffic profile; and analyze whether a page satisfies users' information needs by applying a distance measure between the keywords of the page profile and the keywords of the page traffic profile and combining the distance measure result with a success rate of the keywords, wherein generating a page traffic profile includes:

clustering keywords used to visit the page of multiple users to generate a list of keywords representing a group of users' information needs; and computing a relative success rate of a cluster of keywords.

18. A system for measuring web site satisfaction of information needs comprising:

a processor;

a page selection component for selecting a page for analysis;

a page profile component for generating a page profile in the form of a list of keywords representing the page;

a page traffic profile component for generating a page traffic profile in the form of lists of keywords representing information needs of users, wherein the page traffic profile is generated from keywords used by users to visit the page;

a success component for determining the success of users' visits to the page using keywords of the page traffic profile; and an analysis component for analyzing whether a page satisfies users' information needs by applying a distance measure between the keywords of the page profile and the keywords of the page traffic profile and combining the distance measure result with a success rate of the keywords, wherein the page traffic profile component includes:

a clustering component for clustering keywords used to visit the page of multiple users to generate a list of keywords representing a group of users' information needs; and a cluster success component for computing a success rate of a cluster.

19. The system as claimed in claim 18, including:

a visualization component for displaying a visualization of the analysis including:

displaying a first tag cloud of the list of keywords of the page profile with a scaled representation of how representative the keyword is of the page content;

displaying a second tag cloud of the list of keywords of the page traffic profile with a scaled representation of how well satisfied the keyword is in the page content.

20. The system as claimed in claim 19, wherein in the first tag cloud different colors are used to represent scales of well represented keywords and scales of poorly represented keywords.

21. The system as claimed in claim 19, wherein in the second tag cloud different colors are used to represent scales of well satisfied the keywords in the page content and scales of poorly satisfied keywords in the page content.

22. A system for measuring web site satisfaction of information needs comprising:

a processor;

a page selection component for selecting a page for analysis;

a page profile component for generating a page profile in the form of a list of keywords representing the page;

a page traffic profile component for generating a page traffic profile in the form of lists of keywords representing information needs of users, wherein the page traffic profile is generated from keywords used by users to visit the page;

a success component for determining the success of users' visits to the page using keywords of the page traffic profile; and an analysis component for analyzing whether a page satisfies users' information needs by applying a distance measure between the keywords of the page profile and the keywords of the page traffic profile and combining the distance measure result with a success rate of the keywords, wherein the page traffic profile component includes:

a clustering component for clustering keywords used to visit the page of multiple users to generate a list of keywords representing a group of users' information needs, and wherein the analysis component includes:

a distance measuring component for measuring a distance between the list of keywords of the page profile and the list of keywords of a cluster generated by the clustering component.

* * * * *